Feb. 13, 1951 R. S. CRENSHAW, JR 2,541,041
BINARY TYPE ELECTRONIC COUNTER CIRCUIT
Filed Dec. 9, 1949 2 Sheets-Sheet 1

INVENTOR
RUSSELL SYDNOR CRENSHAW, JR.

BY *M. Hayes*

ATTORNEY

INVENTOR
RUSSELL SYDNOR CRENSHAW, JR.

BY *M. O. Hayes*
ATTORNEY

Patented Feb. 13, 1951

2,541,041

UNITED STATES PATENT OFFICE 2,541,041

BINARY TYPE ELECTRONIC COUNTER CIRCUIT

Russell Sydnor Crenshaw, Jr., United States Navy, Virginia Beach, Va.

Application December 9, 1949, Serial No. 132,182

17 Claims. (Cl. 315—229)

(Granted under the act of March 3, 1883, as amended April 30, 1928; 370 O. G. 757)

This invention relates to electron tube counting circuits and more particularly relates to a cold cathode gaseous diode electron tube counting ring responsive step by step to each of a plurality of electrical potential pulses.

There are many methods of counting. Mechanical counters are generally unsatisfactory for high counting rates but often are used to follow the output of electronic counters or dividing circuits which are used to reduce the rate. Generally electronic counter circuits are either the sequence operated type or the energy storage type, both types automatically recycle after the given number of input pulses and both types produce an output pulse by the resetting action. This invention relates to the type of sequence operated circuits which are in the form of a ring composed of a number of identical units each of which possess two stable states of operation designated as "on" and "off."

Continuing in general terms, the pulses to be counted are applied simultaneously to all units and the units are so interconnected that a pulse will turn a unit "on" only if the unit immediately preceding it is "on" at the time the pulse is applied. The interconnection of the units provides that only one unit can be "on" at a time, and moreover, the unit "on" at the time the pulse is applied is placed in the "off" state. Usually some means are provided to indicate the "on" unit and to insure that the "zero" unit is "on" at the beginning of the counting interval.

The most common type of electrical sequence operated counter is the scale-of-two counter. It is the simplest form of the ring counter and possesses the advantage that there is no upper limit on the time interval btween successive pulses. When such simple counters are connected in a cascade—i. e., the output of one is the input of the next—a binary counter may be formed in which the count is expressed in terms of the exponents of the number 2.

In the operation of computing machines it is of considerable advantage to operate in the binary system in which the number of alternatives presented at each operation is limited to two. Thus all the data, numerical or logical, put into the machine, are in the form of a set of choices between two alternatives; and all the operations on the data take the form of making a set of new choices depend on a set of old choices according to a fixed set of rules.

There are a number of well-known electronic circuits which have the necessary two stable states of operation required for the units of a counting ring. Often such circuits are critical, not only with respect to tube characteristics and circuit constants, but also in regard to requiring input pulses of controlled amplitude and wave form. Further, such circuits are complex, needing numbers of grid controlled vacuum tubes or grid controlled gaseous discharge tubes in addition to the glow discharge diodes usually used for indicators.

The principal object of the present invention is to provide an electronic counting system which is not only smaller, simpler, and less expensive than previous electronic counting systems but particularly adapted to a binary type counting system.

With this object in view, the present invention contemplates the use of cold cathode glow discharge diodes as the primary tubes in the counter circuit. It is well known that a glow discharge tube does not "ignite" and begin to conduct appreciable current until a critical potential known as the "breakdown" potential is exceeded. If there is a current limiting resistance in the circuit, the glow discharge takes place at a substantially lower potential across the tube which will be called the "running voltage." The difference between these two potentials is substantial but it varies with many factors in the construction of the tube, although it is practically constant for a given tube type. Also a glow discharge tube will extinguish when the voltage drop across it drops below the "extinction voltage." These characteristics provide the glow discharge tube with the two required stable states of operation, "off" and "on," so that it can be incorporated into a circuit to serve as individual units of a sequence type counting ring. These characteristics and the ionization and de-ionization characteristics of the selected tube type influence the maximum counting rate of the circuit of the invention.

Another object of the invention is to provide an electronic counter for counting electric pulses wherein the individual units have cold cathode glow discharge diodes as the primary tubes.

Another object of the invention is to provide a cold cathode glow discharge electronic scale-of-two counter which is adaptable for cascade operation as a binary type counter.

Another object of the invention is to provide an electronic binary counter for counting electrical pulses which shall provide a higher counting rate than mechanical or electro-mechanical type counters with low power requirements and reliable operation.

To accomplish the foregoing general objects and other more specific objects which will hereinafter appear, the invention resides in the circuit elements and their relation one to another as are hereinafter described in the following specification. The specification is accompanied by the drawings in which.

Figure 1:
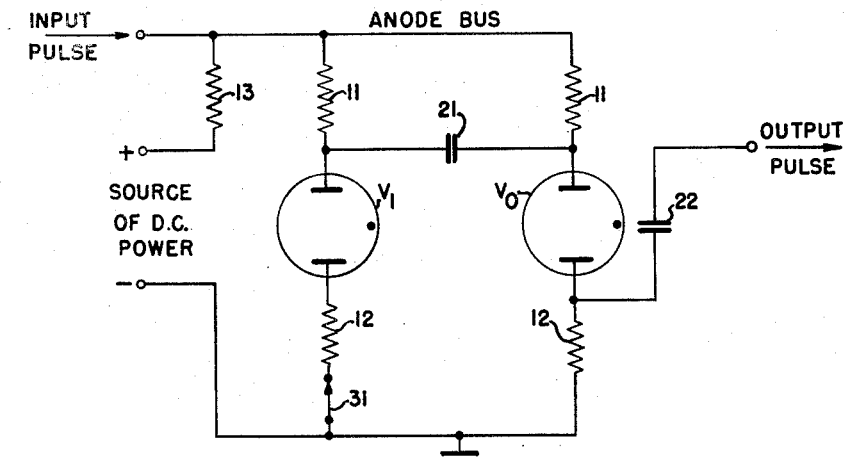
Fig. 1 is a circuit diagram of a simple ring counter in a scale-of-two circuit.

Referring to Fig. 1, the basic circuit diagram of a glow discharge electronic tube scale-of-two circuit is shown. The anode of each cold cathode discharge diode is connected in series with an anode resistor 11 to an anode bus and through a common load resistor 13 to the positive terminal of a direct current power source. The cathode of each glow discharge diode is connected in series with a cathode resistor 12 to ground and the negative terminal of the direct current power source. The coupling from glow discharge diode to diode is by means of a coupling capacitor 21 connected directly from anode to anode.

Referring still to Fig. 1, assume that only the right hand diode $V_0$ is conducting and that the value of the resistors and the voltage of the direct current power source are such that the voltage applied to the anode bus is lower than the breakdown voltage for the diodes $V_0$ and $V_1$. There will be no tendency for the left hand diode $V_1$ to ignite because insufficient voltage is applied to cause breakdown. Similarly it is evident that under the same values of circuit constants, if the left hand diode $V_1$ is conducting and there is no disturbance in the circuit, the right hand diode $V_0$ will not ignite. Therefore, such a unit is stable with either one or the other of the diodes conducting.

Now assume that the anode resistors 11 are greater than the cathode resistors 12. Since the same current flows in the anode circuit and cathode circuit of a given diode, the voltage drop across resistor 11 with tube $V_0$ conducting is greater than the voltage drop across resistor 12. Further, the capacitor 21 will assume a charge equal to the voltage drop across resistor 11 after steady state conditions are established. Now assume that the voltage applied to the anode bus is increased momentarily by a positive input potential pulse so that the breakdown voltage of tube $V_1$ is reached. Tube $V_1$ will immediately ignite and become conducting and the voltage across it will drop to the running voltage. Momentarily the anode of tube $V_0$ will be held at a voltage lower than the anode of tube $V_1$ by the charge on capacitor 21, and since the anode of tube $V_1$ will be held at a voltage equal to the voltage drop across resistor 12 plus the running voltage of the tube, the remaining voltage drop across the tube $V_0$ will be less than the extinction voltage and tube $V_0$ will extinguish. If the voltage of the anode bus has returned to its normal value below the breakdown voltage after the completion of the pulse by the time the charge on capacitor 21 has dissipated and reversed to allow the anode of tube $V_0$ to reach the voltage of the anode bus, tube $V_0$ will remain "off" and will have no tendency to ignite until the circuit receives another pulse. Thus the circuit of Fig. 1 is seen to possess two stable states in which the conduction will shift from one glow discharge diode to the other each time a positive pulse is received at the anode bus.

Figure 2:
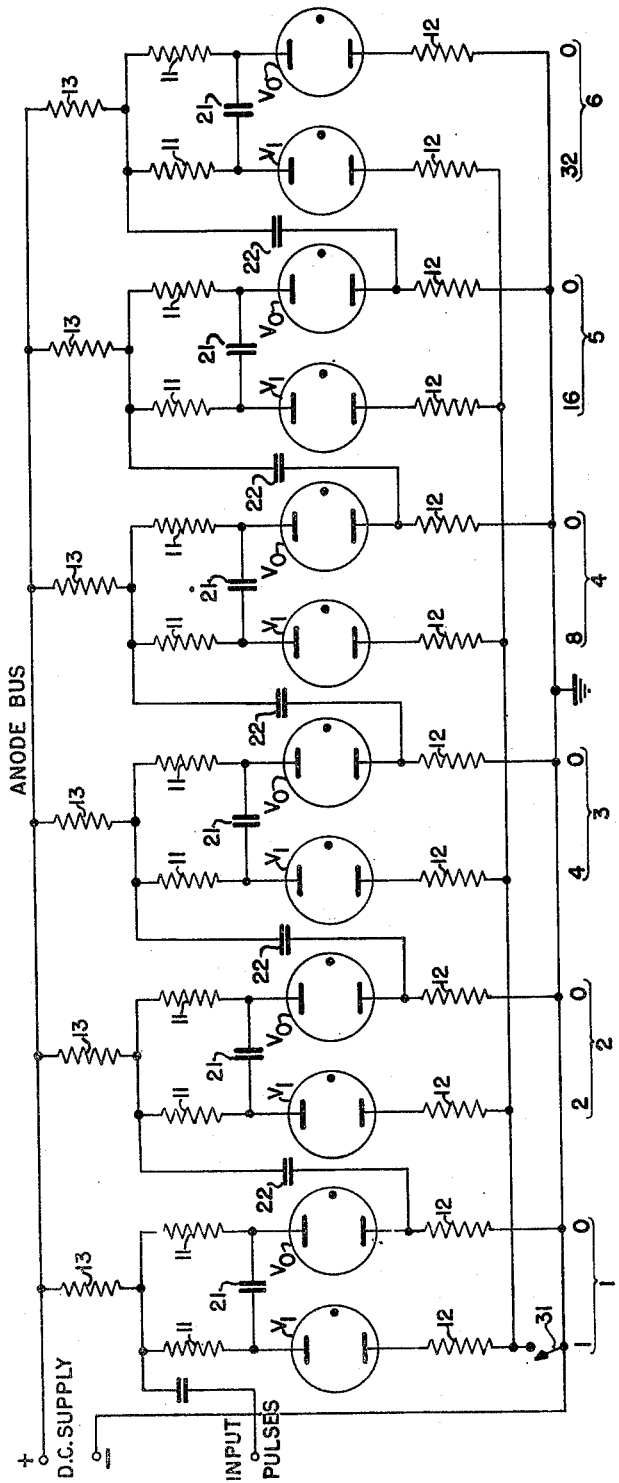
Fig. 2 is a circuit diagram of a binary type counter of six sections derived from the simple counter of Fig. 1.

The circuit diagram of Fig. 2 shows how a plurality of the simple scale-of-two circuits of Fig. 1 may be coupled in cascade—the output of one becoming the input of the next—to form a multiple section binary counter. Although a six section counter is illustrated, the number of sections of scale-of-two circuits which can be connected in series is not limited by the nature of the circuit and is determined by the desired counting capacity of the counter.

In most applications it is required to be able to "zero" the counter before starting to count; that is, to bring all of the sections of the counter to the condition that the $V_0$ tube is conducting. This can be done by momentarily opening switch 31 which disconnects all $V_1$ tubes from the power source.

Referring still to Fig. 2, when the $V_0$ tube of any section ignites, a voltage drop immediately appears across its cathode resistor 12, and similarly when the $V_0$ tube extinguishes, the voltage drop across this resistor immediately drops to zero. By coupling the cathode of the $V_0$ tube of one scale-of-two circuit to the anode bus of the next by a suitable coupling capacitor 22, it is apparent that each time a $V_0$ tube ignites it will apply a positive pulse to the anode bus of the next circuit in the cascade; and each time the $V_0$ tube extinguishes, it will apply a negative pulse to the next scale-of-two circuit. The steady state voltage of the anode bus can be adjusted so that the circuit is normally stable; but, when a positive pulse of the magnitude of the voltage drop across resistor 12 is imposed, the conducting tube will shift, yet a negative pulse of the magnitude of the voltage drop across resistor 12 will not extinguish the conducting tube. Thus it is seen that the $V_0$ tube of any scale-of-two circuit can be coupled to the anode bus of the next succeeding scale-of-two circuit in a cascade and that this coupling acts to make the conduction in the next circuit shift each time the $V_0$ tube ignites.

Consequently in the circuit of Fig. 2, conduction in the first section will shift for every pulse received by the counter. Conduction in the second section will shift every time the $V_0$ tube of the first section ignites or on every second pulse received by the counter. Similarly, conduction will shift in the third section on every fourth pulse, the fourth section on every eighth pulse, and so on in terms of the powers of the number 2. If the $V_0$ tubes are either masked or separated from the $V_1$ tubes and the $V_1$ tubes are numbered in successive sections with the numerals 1, 2, 4, 8, 16, 32, etc., the total number of pulses received by the counter will equal the sum of the numerals of the tubes which are lighted.

Although the above discussion described counter operation for positive input voltage pulses, the circuit will also operate to count negative input voltage pulses. If any scale-of-two circuit receives a negative pulse of sufficient magnitude to extinguish the then conducting tube, upon completion of the pulse as the voltage of the anode bus rises toward the potential of the direct current power source, the tube which was not conducting will be at a higher voltage, by the charge on capacitor 21, than the tube which has just been extinguished. Consequently, the conduction in the circuit will be shifted and when the previously non-conducting tube ignites, the voltage of the anode bus will drop to its normal value thereby holding the anode voltage of the previously conducting tube to a value below the voltage of the anode bus until the charge on the capacitor 21 has reversed. Since the anode voltage of the previously conducting tube will be below the normal running voltage, there will be no tendency for the tube to ignite until another pulse is received to be counted.

Thus it is seen that the counter is flexible in operation in that it can be adjusted to be sensitive to either positive pulses or negative pulses or to pulses of both polarities. Further the internal operation of the counter can be conducted on either positive pulse or negative pulse operation independently of the polarity of the input pulse. However, in the event negative pulsing is used, the tube numeral's must be reversed from the designation of Fig. 2, and the ground connection made on the opposite side of switch 31.

Figure 3:
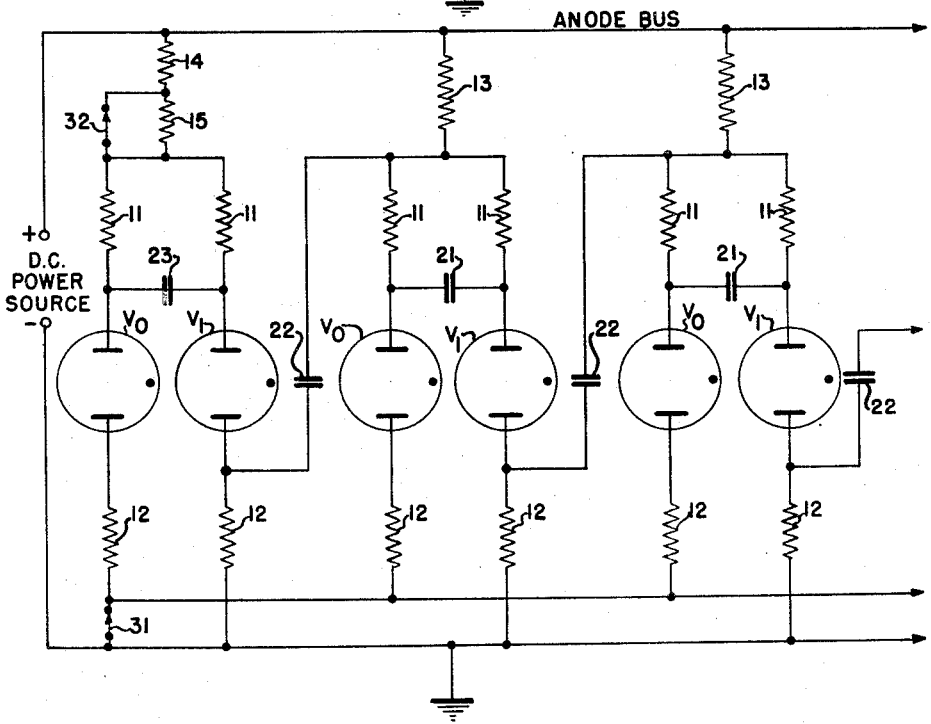
Fig. 3 is a modification of the invention adapted to operate as a timer.

Fig. 3 presents the circuit diagram of a modification of the invention in which the counter operates as an electronic timer. From the foregoing discussion it can be readily seen that, if the voltage applied to the first section of the counter is raised above the breakdown voltage of the glow discharge tubes by reducing the value of the load resistors 14 and 15 by the closing of switch 32 to short out resistor 15, as the anode voltage of the tube which is "off" rises to the newly increased voltage of the anode bus, it will ignite, and its conduction together with the charge on capacitor 23 will act to extinguish the then conducting tube. After the capacitor 23 discharges and reverses its charge, the anode voltage of the "off" tube rises to the voltage of the anode bus and the tube ignites, thus the conduction in the circuit again shifts as described above. Under this operating condition the scale-of-two circuit in the first section of the counter acts as an oscillator which is very stable and adjustable over a wide range of frequency by selection of anode bus voltage and the values of resistance and capacitance of the circuit. If the circuit is first "zeroed" by momentarily opening switch 31 and the voltage of the anode bus of the first section raised by closing switch 32 and later lowered again by opening switch 32, the counter will indicate the number of half cycles of the first section operating as an oscillator that occurred during the time interval while switch 32 was closed. Thereby the circuit of Fig. 3 can be used as an interval timer without the need of an outside source of excitation pulses.

Since the glow discharge tubes require a finite time to ionize or "ignite" and also a finite time to de-ionize after extinction, a definite limitation is placed on the maximum frequency of operation of the counter in response to incoming pulses. The particular tube construction, gas pressure, temperature, current previous to extinction, and applied voltage are among the several factors which act to determine the de-ionization time of a given glow discharge tube. Therefore the values of resistances and capacitances used in the circuit will depend upon the type of glow discharge tube selected and upon the particular application for which the counter is designed. Although resistor 11 was assumed to be greater than resistor 12 in the discussion of Fig. 1 to clarify the explanation of the positive input pulse operation of the circuit, this is not a necessary limitation to successful operation of the circuit of the invention. It is evident that the pulse time duration must allow de-ionization of the previously conducting tube to occur and the pulse repetition frequency must permit the charge on capacitor 21 to reach the stable state.

While several embodiments of the invention have been disclosed and described, it is understood that other modifications and changes may be made in the invention without departing from the spirit and scope thereof as set forth in the appended claims.

The invention described herein may be manufactured and used by or for the Government of the United States of America for governmental purposes without the payment of any royalty thereon or therefor.

What is claimed is:

1. A sequence operated scale-of-two circuit for an electronic counter of electrical pulses comprising a pair of glow discharge diodes, a direct current power source including a current limiting resistance, coupling means for energizing said diodes from said source, said means including a storage capacitor, and means for applying said pulses to said diodes simultaneously.

2. An electronic counting system for binary counting of electrical pulses comprising a chain of scale-of-two circuits connected in cascade wherein the output of one circuit is coupled to the input of the next, each circuit including a pair of glow discharge diodes, a direct current power source including a current limiting resistance, coupling means for energizing said diodes from said source, said means including a storage capacitor, means for applying an input pulse to be counted to said pair of diodes simultaneously, and means coupled to one of said diodes to provide one output pulse for every second input pulse.

3. A sequence operated scale-of-two electronic counter circuit for counting electric pulses comprising a pair of cold cathode glow discharge diodes having anode and cathode electrodes, a direct current power source for energizing said diodes, said source including a load resistor to limit the amplitude of the voltage applied to said diodes below the breakdown potential of said diodes while one of said diodes is conducting, means common to both diodes for coupling said pulses to said circuit, and a storage capacitor connected from the anode of one diode to the anode of the other diode, whereby the potential charge on said storage capacitor acts with each input pulse to convert the then conducting diode to the non-conducting state while the then non-conducting diode is converted to the conducting state.

4. A sequence operated scale-of-two electronic counter circuit for counting electric pulses comprising a pair of cold cathode glow discharge diodes having anode and cathode electrodes, a direct current power source for energizing said diodes, resistance means conductively connecting each anode and each cathode to the positive and negative terminals respectively of said source, said source including means to adjust the voltage applied to said diodes to an amplitude below the breakdown potential of said diodes while one of said diodes is conducting, a storage capacitor connected from the anode of one diode to the anode of the other diode, and means for applying said pulses to said diodes simultaneously, whereby said storage capacitor becomes charged by the conduction of one of said diodes to aid said pulse to convert the then non-conducting diode to the conducting state while extinguishing the then conducting diode.

5. An electronic counting system for binary counting of electrical potential pulses comprising a chain of scale-of-two circuits connected in cascade so that the output of one circuit is coupled to the input of the next, each circuit including a pair of glow discharge diodes having anode and cathode electrodes, a direct current power source including a current limiting impedance, resistance coupling means for energizing said diodes from said source, a storage capacitor connected from the anode of one diode to the anode of the other diode, and a capacitor coupling the cathode of one of said diodes of each of said circuits to the anode resistors of the next circuit in said chain, whereby each circuit provides one output pulse to the next circuit in said chain for every second input pulse.

6. In an electronic counting system for binary counting of input electrical potential pulses, a chain of scale-of-two circuits each including a pair of cold cathode glow discharge diodes, each of said circuits having a first condition of stability in which one of said diodes is conducting and a second condition of stability in which the other of said diodes is conducting, a source of direct current power, variable impedance means in each of said circuits for adjusting the voltage applied to said diodes to an amplitude lower than the breakdown potential of said diodes while one of said diodes is conducting, means for applying an input pulse to be counted to both diodes of a circuit simultaneously, means in each of said circuits including a storage capacitor for energizing said diodes from said power source, said capacitor becoming charged by the conduction of one of said diodes to aid each of said input pulses to shift said circuit from one condition of stability to the other condition of stability, and means coupled to one of said diodes of a circuit to supply one output potential pulse to the next circuit in said chain for every second input pulse.

7. An electronic timing system employing binary counting of electrical input pulses occurring within the timing period comprising a chain of scale-of-two circuits connected in cascade so that the output of one circuit is coupled to the input of the next, each circuit including a pair of glow discharge diodes having anode and cathode electrodes, a direct current power source for energizing said circuits, variable impedance means in each of said circuits for adjusting the voltage applied to said diodes to an amplitude lower than the breakdown potential of said diodes while one of said diodes is conducting, means for applying an input pulse to be counted to both diodes of a circuit simultaneously, means in each of said circuits including a storage capacitor for energizing said diodes from said power source, means coupled to the cathode of one of said diodes in each of said circuits to supply one output pulse to the next circuit in said chain for every second input pulse, and means to increase the voltage applied to the diodes of the first of said chain of scale-of-two circuits to exceed the breakdown potential of said diodes for the time interval to be counted, whereby said storage capacitor of said first circuit becomes charged by the conduction of one of said diodes to extinguish the then conducting diode upon the ignition of the then non-conducting diode to generate a succession of pulses to be counted during said time interval.

8. An electronic timing system employing binary counting of electrical pulses occurring within the timing period comprising a chain of scale-of-two circuits each including a pair of cold cathode glow discharge diodes, each of said circuits having a first condition of stability in which one of said diodes is conducting and a second condition of stability in which the other of said diodes is conducting, a source of direct current energy, variable impedance means in each of said circuits for adjusting the voltage applied to said diodes to an amplitude lower than the breakdown potential of said diodes while one of said diodes is conducting, means for applying an input pulse to be counted to both diodes of a circuit simultaneously, means in each of said circuits including a storage capacitor to energize said diodes from said source, said storage capacitor becoming charged by the conduction of one of said diodes to act with an input pulse to shift said circuit from one condition of stability to the other condition of stability, means coupled to one of said diodes in a circuit to supply one output pulse to the next circuit in said chain for every second input pulse, and means to increase the voltage applied to the diodes of the first circuit in said chain to exceed the breakdown potential of said diodes for the time interval to be counted, whereby the storage capacitor of said first circuit becomes charged by the conduction of one of said diodes to act to extinguish the then conducting diode upon the ignition of the non-conducting diode to generate a succession of pulses to be counted during said time interval.

9. A sequence operated scale-of-two circuit for an electronic counter of electrical pulses comprising, a pair of two-electrode glow discharge tubes, a direct current power source including a current limiting resistor, coupling means for energizing said tubes from said source, a storage capacitor connected between similarly polarized electrodes of said tubes, and means for applying said pulses to said tubes simultaneously.

10. A sequence operated scale-of-two circuit for an electronic counter of electrical pulses comprising a pair of two-electrode glow discharge tubes, a direct current power source including a current limiting resistance, coupling means for energizing said tubes from said source, a storage capacitor connected between the positive electrodes of said tubes, and means for applying said pulses to said tubes simultaneously.

11. A sequence operated scale-of-two circuit for an electronic counter of electrical pulses comprising, a pair of glow discharge diodes, a direct current power source including a current limiting resistance to limit the amplitude of the voltage applied to said diodes below the breakdown potential of said diodes while one of said diodes is conducting, a coupling means for energizing said diodes from said source, a storage capacitor connected across said coupling means to receive a polarity of charge related to the flow of current to a conducting diode, and means for applying said pulses to said diodes simultaneously, whereby the potential charge on said storage capacitor acts with each input pulse to convert the then conducting diode to the non-conducting state while the then non-conducting diode is converted to the conducting state.

12. An electronic counting system for binary counting of electrical pulses comprising a chain of scale-of-two circuits connected in cascade wherein the output of one circuit is coupled to the input of the next, each circuit including a pair of two electrode glow discharge tubes, a direct current power source including a current limiting resistance, coupling means for energizing said tubes from said source, a storage capacitor connected between the positive electrodes of said tubes, means for applying an input pulse to be counted to said pair of diodes simultaneously, and means coupled to one of said diodes to provide one output pulse for every second input pulse.

13. A sequence operated scale-of-two circuit having two stable states for an electronic counter of electrical pulses comprising, a pair of glow discharge diodes having anode and cathode electrodes, a direct current power source including a current limiting impedance to limit the amplitude of the voltage applied to said diodes below the breakdown potential of said diodes while one of said diodes is conducting, resistance means conductively connecting each anode and each cathode to the positive and negative terminals respectively of said source, means for applying an input pulse to be counted to both diodes simultaneously, a storage capacitor connected from the anode of one diode to the anode of the other diode, said capacitor becoming charged by the conduction of one of said diodes to aid each of said input pulses to exceed the breakdown potential of the nonconducting diode for the duration of said pulse and to reduce the potential of the conducting diode below its extinction potential, whereby said circuit is shifted from one stable state to another stable state, and means coupled to one of said diodes on conduction of said diode to produce one output pulse for every second input pulse.

14. In an electronic counting system for binary counting of input electrical potential pulses, a chain of scale-of-two circuits each including a pair of cold cathode discharge diodes having anode and cathode electrodes, each of said circuits having a first condition of stability in which one of said diodes is conducting and a second condition of stability in which the other of said diodes is conducting, a source of direct current power for energizing said diodes, variable impedance means in each of said circuits for adjusting the voltage applied to said diodes to an amplitude lower than the breakdown potential of said diodes, while one of said diodes is conducting, resistance means conductively connecting each anode and each cathode to the positive and negative terminals respectively of said source, means for applying an input pulse to be counted to both diodes of a circuit simultaneously, a storage capacitor connected from the anode of one diode to the anode of the other diode, said capacitor becoming charged by the conduction of one of said diodes to aid each of said input pulses to shift said circuit from one condition of stability to the other condition of stability, and means coupled to one of said diodes of a circuit to supply one output potential pulse to the next circuit in said chain for every second input pulse.

15. An electronic timing system employing binary counting of electrical input pulses occurring within the timing period comprising, a chain of scale-of-two circuits connected in cascade so that the output of one circuit is coupled to the input of the next, each circuit including a pair of glow discharge diodes having anode and cathode electrodes, a direct current power source for energizing said diodes, resistance means conductively connecting each anode and each cathode to the positive and negative terminals respectively of said source, variable impedance means in each of said circuits for adjusting the voltage applied to said diodes to an amplitude lower than the breakdown potential of said diodes while one of said diodes is conducting, means for applying an input pulse to be counted to both diodes of a circuit simultaneously, a storage capacitor connected from the anode of one diode to the anode of the other diode, means coupled to the cathode of one of said diodes in each of said circuits to supply one output pulse to the next circuit in said chain for every second input pulse, and means to increase the voltage applied to the diodes of the first of said chain of scale-of-two circuits to exceed the breakdown potential of said diodes for the time interval to be counted, whereby said storage capacitor of said first circuit becomes charged by the conduction of one of said diodes to extinguish the then conducting diode upon the ignition of the then nonconducting diode to generate a succession of pulses to be counted during said time interval.

16. An electronic timing system employing binary counting of electrical pulses occurring within the timing period comprising, a chain of scale-of-two circuits each including a pair of cold cathode glow discharge diodes having anode and cathode electrodes, each of said circuits having a first condition of stability in which one of said diodes is conducting and a second condition of stability in which the other of said diodes is conducting, a direct current power source for energizing said diodes, variable impedance means in each of said circuits for adjusting the voltage applied to said diodes to an amplitude lower than the breakdown potential of said diodes while one of said diodes is conducting, means for applying an input pulse to be counted to both diodes of a circuit simultaneously, a storage capacitor connected from the anode of one diode to the anode of the other diode, said storage capacitor becoming charged by the conduction of one of said diodes to act with an input pulse to shift said circuit from one condition of stability to the other condition of stability, means coupled to one of said diodes in a circuit to supply one output pulse to the next circuit in said chain for every second input pulse, and means to increase the voltage applied to the diodes of the first circuit in said chain to exceed the breakdown potential of said diodes for the time interval to be counted, whereby the storage capacitor of said first circuit becomes charged by the conduction of one of said diodes to act to extinguish the then conducting diode upon the ignition of the then nonconducting diode to generate a succession of pulses to be counted during said time interval.

17. An electronic counting system for binary counting of electrical pulses comprising a chain of scale-of-two circuits connected in cascade wherein the output of one circuit is coupled to the input of the next, each circuit including a pair of glow discharge diodes, a direct current power source including a current limiting resistance to limit the amplitude of the voltage applied to said diodes below the breakdown potential of said diodes while one of said diodes is conducting, coupling means for energizing said diodes from said source, a storage capacitor connected across said coupling means to receive a polarity of charge related to the flow of current to a conducting diode, means for applying said pulses to said diodes simultaneously whereby the potential charge on said storage condenser acts with each input pulse to convert the then conducting diode to the nonconducting state while the then nonconducting diode is converted to the conducting state, and means coupled to one of said diodes to provide one output pulse for every second input pulse.

RUSSELL SYDNOR CRENSHAW, Jr.

REFERENCES CITED

The following references are of record in the file of this patent:

UNITED STATES PATENTS

| Number | Name | Date |
|---|---|---|
| 2,310,328 | Swift | Feb. 9, 1943 |